Dec. 18, 1923. 1,477,913
B. F. SEYMOUR
COMBINED RESILIENT BEARING AND DRIVE
Filed March 22, 1920
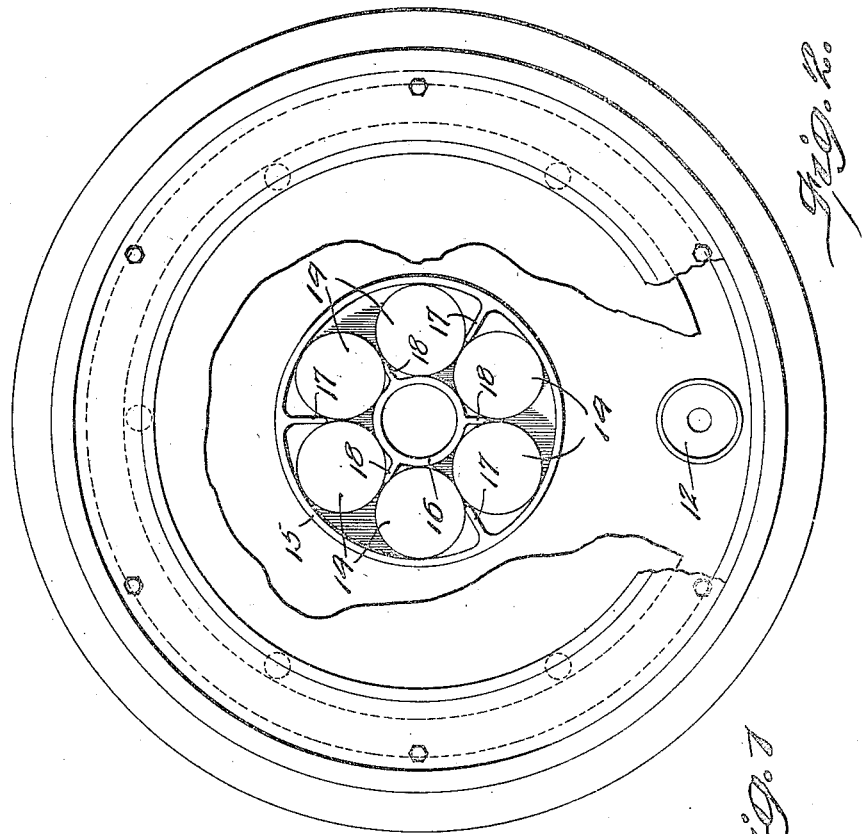
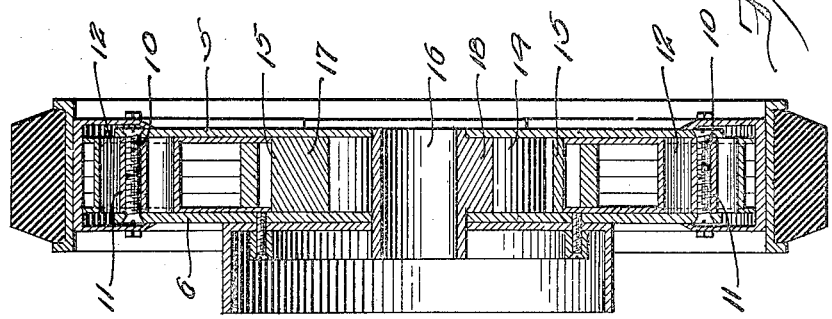
B. F. Seymour INVENTOR.
BY
ATTORNEY.
WITNESS Patented Dec. 18, 1923.

1,477,913

UNITED STATES PATENT OFFICE.

BENJAMIN F. SEYMOUR, OF INDIANAPOLIS, INDIANA.

COMBINED RESILIENT BEARING AND DRIVE.

Application filed March 22, 1920. Serial No. 367,713.

*To all whom it may concern:*

Be it known that I, BENJAMIN F. SEYMOUR, a citizen of the United States, residing at Indianapolis, in the county of Marion and State of Indiana, have invented certain new and useful Improvements in Combined Resilient Bearings and Drives; and I do hereby declare the following to be a full, clear, and exact description of the invention, such as will enable others skilled in the art to which it appertains to make and use the same.

The present invention relates to resilient transmissions and bearings, more particularly for vehicle wheels, and consists in the combinations and arrangements of elements hereinafter described and particularly set forth in the accompanying claim.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

A further purpose of the invention is to provide a combined resilient transmission and bearing for a vehicle wheel to the end that such a wheel may possess the desired resilient qualities and also give the necessary transmission medium between the wheel proper and the motive power of the vehicle.

The invention is shown by way of illustration in the accompanying drawings wherein, Figure 1 is a central sectional view showing the application of a device to a vehicle wheel, and Figure 2 is a side elevational view thereof with parts broken away for clearness.

Referring to the construction in further details and wherein like reference characters designate corresponding parts, the construction consists of a hub portion formed of two side plates, or housing members, 5 and 6 which are disposed against the inner rim portion 9 of the wheel, as shown. The two hub members 5 and 6 are secured to the wheel rim by the series of pairs of bolts 10 that screw into threaded sleeves 11 that serve as spacing elements and which are located within the spaces, or chambers, 12, as indicated in Figures 1 and 2. It will be understood, of course, that said spaces 12 are provided to allow the wheel rim to have limited radial movement with respect to the axis 13 of the wheel.

The resilient and bearing device per se consists of a plurality of cylindrical members 14 constructed of any suitable material, but preferably of rubber and which are located between the inner rim portion 15 and the axle spindle 16, as shown, and said members 14 are of such dimensions as to fit closely within the space between the wheel rim 15 and spindle 16 to maintain the wheel in true alinement throughout and under the necessary stability for its normal functions.

The drive between the spindle 16 and the wheel rim consists of a plurality of inwardly disposed and rigid members 17 suitably secured in any approved manner to the inner rim portion 15 and disposed to engage between each pair of resilient blocks 14, and coacting therewith; and in like manner constructed, is the series of radially disposed and rigid members 18 also engaging between said blocks in pairs but in alternate relation to the members 17, as shown.

It will be seen from the foregoing that the several cylindrical blocks 14 of rubber, or rings of spring steel, will permit of limited radial movement of the wheel rim with respect to the axle and also that the wheel may be positively driven from the transmission of the car, and that all relative movements of the wheel parts will operate in a quiet manner and without undue friction or heating of the elements thereof.

It will be obvious, of course, that different forms of construction may be provided in lieu of that disclosed and described herein. And while I have shown and described certain apparatus for accomplishing the result initially stated, it is to be understood that I am not limited to the precise details shown, but may on the other hand adopt such modifications or changes within the scope of the claim to better suit the end in view.

Having thus described my invention, what I claim as new and desire to protect by United States Letters Patent is:

In a resilient wheel having side plates and an inner rim portion, the combination of a plurality of independent and resilient cylindrical blocks located between said side plates and extending radially from the axle spindle of the wheel to said inner rim portion, said resilient blocks having their axes disposed parallel with the wheel axis, rigid and radially disposed members on said rim portion engaging between the respective pairs of blocks, and rigid and radially disposed members on the spindle engaging between the respective pairs of said blocks and alternating with the radial members on the rim portion and cooperable therewith to provide a drive, substantially as set forth.

In testimony whereof I affix my signature.

BENJAMIN F. SEYMOUR.